(12) United States Patent
Leibovich et al.

(10) Patent No.: US 9,686,512 B2
(45) Date of Patent: Jun. 20, 2017

(54) MULTI-USER INTERACTIVE VIRTUAL ENVIRONMENT INCLUDING BROADCAST CONTENT AND ENHANCED SOCIAL LAYER CONTENT

(71) Applicant: KIK INTERACTIVE INC., Waterloo (CA)

(72) Inventors: Ilan Leibovich, Tel Aviv (IL); Dany Fishel, Tel Aviv (IL); Moshe Levin, Rannana (IL); Elliot Jaffe, Hasmonaim (IL); Oren Levy, Herzliya (IL); Natasha Shine, Neve Monoson (IL); Gadi Srebnik, Tel Aviv (IL)

(73) Assignee: KIK INTERACTIVE INC., Waterloo (CA)

( * ) Notice: Subject to any disclaimer, the term of this patent is extended or adjusted under 35 U.S.C. 154(b) by 0 days.

(21) Appl. No.: 15/006,559

(22) Filed: Jan. 26, 2016

(65) Prior Publication Data

US 2016/0142677 A1 May 19, 2016

Related U.S. Application Data

(62) Division of application No. 14/079,899, filed on Nov. 14, 2013, now Pat. No. 9,282,129.

(60) Provisional application No. 61/854,815, filed on May 2, 2013, provisional application No. 61/796,538, filed on Nov. 14, 2012.

(51) Int. Cl.
*H04N 7/15* (2006.01)
*H04L 29/06* (2006.01)
(Continued)

(52) U.S. Cl.
CPC ......... *H04N 7/155* (2013.01); *H04L 12/1818* (2013.01); *H04L 12/1822* (2013.01);
(Continued)

(58) Field of Classification Search
CPC .......... H04N 7/15; H04N 7/152; H04N 7/157; H04N 21/8193; H04N 21/8586;
(Continued)

(56) References Cited

U.S. PATENT DOCUMENTS 5,867,654 A * 2/1999 Ludwig .................. G06Q 10/10
348/E7.081
6,785,708 B1 8/2004 Busey et al.
(Continued)

OTHER PUBLICATIONS

WIPO, International Search Report for PCT/IB13/03139, Jul. 11, 2014.
(Continued)

*Primary Examiner* — Melur Ramakrishnaiah
(74) *Attorney, Agent, or Firm* — Perry + Currier Inc.

(57) ABSTRACT

A system and method for providing interactive graphical and multi-media connectivity between a plurality of users, especially in the context of shared content. In aspects, the users are placed into common virtual rooms or virtual interactive environments to permit sharing of content and chat between the individuals in a same virtual interactive environment. Participating users can thereby exchange social layer content as an enhanced content layer beyond a common broadcast content they are experiencing together. Other features and associated functions are also described.

5 Claims, 6 Drawing Sheets

(51) Int. Cl.
| | |
|---|---|
| H04N 21/4788 | (2011.01) |
| H04L 12/18 | (2006.01) |
| H04N 21/81 | (2011.01) |
| H04N 21/858 | (2011.01) |
| H04N 21/61 | (2011.01) |
| H04N 21/258 | (2011.01) |
| H04N 21/431 | (2011.01) |
| H04N 21/4223 | (2011.01) |

(52) U.S. Cl.
CPC ........ *H04L 65/403* (2013.01); *H04L 65/4038* (2013.01); *H04N 7/152* (2013.01); *H04N 7/157* (2013.01); *H04N 21/25891* (2013.01); *H04N 21/4312* (2013.01); *H04N 21/4788* (2013.01); *H04N 21/6118* (2013.01); *H04N 21/6125* (2013.01); *H04N 21/6143* (2013.01); *H04N 21/8193* (2013.01); *H04N 21/8586* (2013.01); *H04N 21/4223* (2013.01)

(58) Field of Classification Search
CPC ............ H04N 12/1818; H04N 21/4223; H04L 65/403; H04L 65/4038; H04L 12/1822; H04L 12/1818
USPC ...... 348/14.01–14.16; 709/204; 725/32, 109; 715/758
See application file for complete search history.

(56) References Cited

U.S. PATENT DOCUMENTS

| | | | |
|---|---|---|---|
| 7,533,146 B1 | 5/2009 | Kumar | |
| 8,060,624 B1* | 11/2011 | McKinney | .......... H04L 12/5815 370/254 |
| 2002/0133405 A1 | 9/2002 | Newnam et al. | |
| 2005/0273808 A1* | 12/2005 | Zeidman | ................ G06Q 30/02 725/32 |
| 2006/0117340 A1 | 6/2006 | Pavlovskaia et al. | |
| 2008/0172680 A1 | 7/2008 | Gyorfi et al. | |
| 2010/0095225 A1 | 4/2010 | Langlois et al. | |
| 2010/0122182 A1 | 5/2010 | Bromenshenkel et al. | |
| 2010/0205541 A1 | 8/2010 | Rapaport et al. | |
| 2010/0242074 A1 | 9/2010 | Rouse et al. | |
| 2011/0047487 A1* | 2/2011 | DeWeese | ............ H04L 12/1818 715/758 |
| 2011/0225516 A1 | 9/2011 | Goldman et al. | |
| 2012/0198324 A1 | 8/2012 | Mahajan et al. | |

OTHER PUBLICATIONS

WIPO, International Search Report for PCT/IB13/02956, Jul. 17, 2014.
Communication pursuant to Article 94(3) EPC dated Oct. 20, 2016 for European Patent Application No. 13854922.5.
"A new way for web page partial customization and sharing with URL", IP.com Journal, IP.com Inc., West Henrietta, NY, US, Sep. 2, 2011 (Sep. 2, 2011), XP013144670, ISSN: 1533-0001.
European Patent Office, "Supplementary European Search Report, EP App. No. 13854922", Jun. 16, 2016, EPO.
European Patent Office, "Supplementary European Search Report, EP App. No. 13854646", Jun. 22, 2016, EPO.
"Google+ Hangouts on Air: Technical Guide", 2012, Google, http://services.google.com/th/files/blogs/Hangouts_On_Air_Technical_Guide.pdf.
S. Dutton, "Getting Started with WebRTC", Jul. 23, 2012, http://www.html5rocks.com/en/tutorials/webrtc/basics/.
V. Darveau-Garneau, "Google+ Post", May 8, 2012, Google, https://plus.google.com/+NicolasDarveauGarveau/posts/BC3JgK5NsEH.

* cited by examiner

MULTI-USER INTERACTIVE VIRTUAL ENVIRONMENT INCLUDING BROADCAST CONTENT AND ENHANCED SOCIAL LAYER CONTENT

RELATED APPLICATIONS

The present application is a divisional of and claims the benefit and priority of U.S. application Ser. No. 14/079,899 entitled "Multi-User Interactive Virtual Environment Including Broadcast Content and Enhanced Social Layer Content", filed on Nov. 14, 2013, which is related to and claims priority of U.S. Provisional Application No. 61/796,538, filed on Nov. 14, 2012, and to U.S. Provisional Application No. 61/854,815, filed on May 2, 2013, all of which are hereby incorporated by reference.

TECHNICAL FIELD

The present disclosure relates to the user experiences in software applications that allow sharing of virtual spaces such as online interactive environments allowing users to interactively experience a medium as well as to communicate with one another in that context.

BACKGROUND

Conferencing over a network connection (sometimes called virtual conferencing) and screen sharing software are known in the computing and communication fields. For example, Skype® is a service providing near real-time voice and video connectivity between two or more subscribers. A first subscriber who has a registered identity and membership to the service makes contact with another registered subscriber and requests a connection. The service determines the availability of the second subscriber and a call request is presented to the second subscriber similar to a telephone call but in a computer application running on the subscribers' computers. A conference of several subscribers can be arranged as well.

Computer-based telephony can also connect a plurality of registered users to one another in an online-supported conference call. Other applications and services, e.g., Citrix®, provide shared screen experiences and remote screen sharing and control. Yet others provide interactive whiteboarding experiences where two or more users can see each others' actions entered onto a computer based window.

FIG. 1 illustrates an example of a screen shot of an application having a user interface window 10, WebEx®, providing real-time video conferencing among a group of users 108. This example is presented here generically to describe this type of art, and not by way of explaining any specific aspect of a named piece of prior art or product. A user 106 can be the host of the conference (initiates it and coordinates its start and stop). Another user 104 can be displayed in a highlighted or enlarged window when he or she is speaking (has the microphone). Chat sessions 102 can be displayed in other portions of the user interface 10 of the application. In addition, the users can share graphical content 100 that is shown in yet another portion of user interface 10.

Since the moderator or host 106 creates the session as a virtual meeting for collaboratively sharing content 100 and discussion, the session is dedicated to the topic chosen by the host 106. A known problem with such scenarios is that once the number of participants exceeds some number, it becomes difficult or impossible for each of them to receive meaningful attention or have an active participation, akin to the problem known as the "cocktail party effect" in some contexts, where too many people in a room cause a nonlinear escalation of the din of conversation so that nearly nobody can conduct a conversation any more.

Other challenges to existing systems that remain unfulfilled or sub-optimal include that proper shared user experiences require near real-time synchronization between the participants. Also, most such existing systems are based on desktop computing platforms and require substantial computing resources (bandwidth, memory, computing cycles) and do not lend themselves well to compact personal devices such as mobile smartphones, tablets and the like. The present disclosure addresses these and other shortcomings of the existing art.

SUMMARY

A system and method for providing interactive graphical and multi-media connectivity between a plurality of users, especially in the context of shared content. In aspects, the users are placed into common virtual rooms or virtual interactive environments to permit sharing of content and chat between the individuals in a same virtual interactive environment. A common theme or subject of interest can be a basis for creating one or more virtual interactive environments or virtual rooms that users may be placed into or move between. Other features and associated functions are also described.

Some aspects of the invention are directed to a method for processing information in a network, comprising registering a plurality of users in a user registry by storing respective user data of said users into a first data store; identifying a theme or event of interest to at least a subset of said users; establishing a first network-accessible virtual interactive environment, having a first purpose relating to said theme or event, comprising storing first environment data and first purpose data in a second data store; permitting said one or more of said subset of users to join said first environment over said network and share virtual interactive experiences therein; dynamically creating a second network-accessible virtual interactive environment associated with said first environment and logically linked thereto in said network, including storing second environment data and second purpose data in said second data store; and permitting one or more of said subset of users to join said second environment based on one or more criteria including criteria relating to said user data and criteria based on said theme or event.

BRIEF DESCRIPTION OF THE DRAWINGS

For a fuller understanding of the nature and advantages of the present concepts, reference is made to the following detailed description of preferred embodiments and in connection with the accompanying drawings, in which.

DETAILED DESCRIPTION

Figure 1:
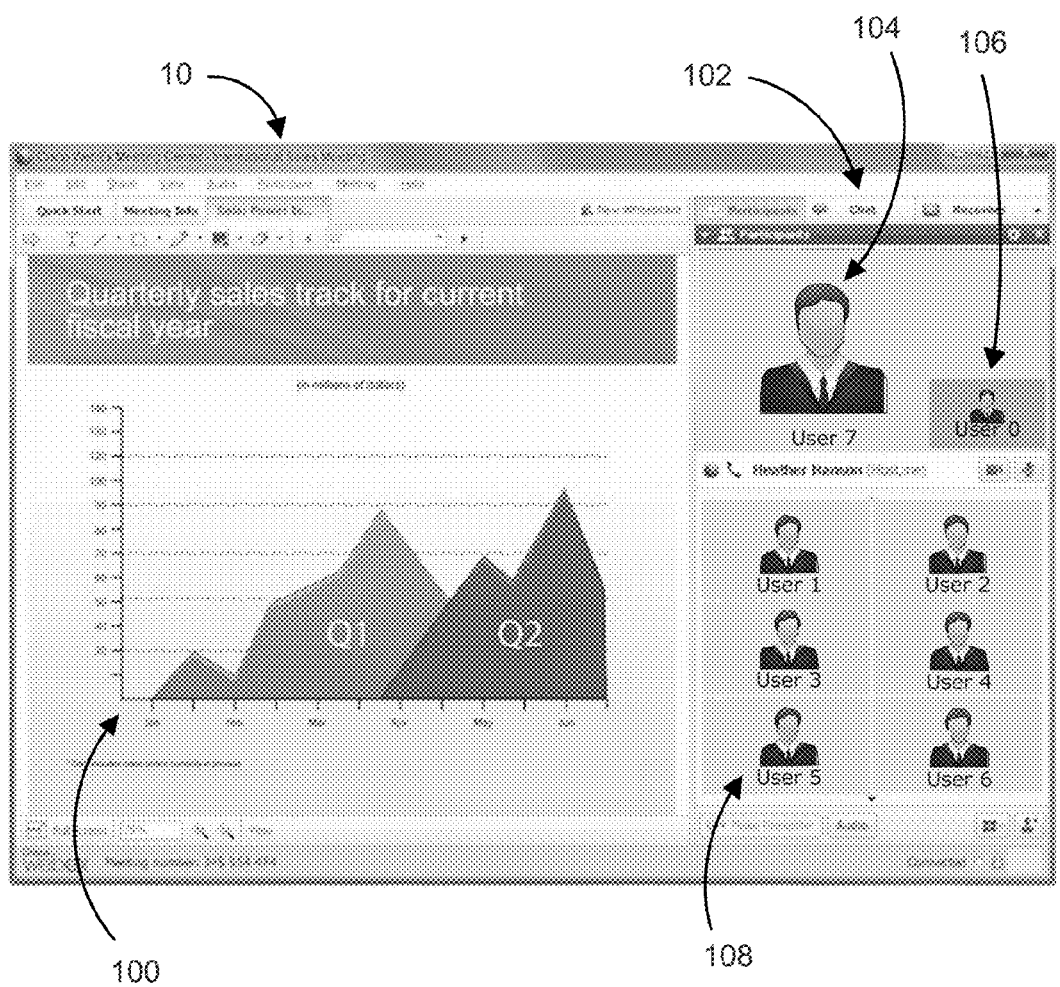
FIG. 1 shows an example of an abstracted user interface of a video conferencing application according to the prior art.

Aspects of the present disclosure are directed to systems and methods for providing virtual interactive experiences. Moreover, in some regards these allow video chat, shared screens and synchronized interactions among a plurality of users using devices connected to a network. These experiences are integrated into a single user experience that can be delivered in a number of forms including companion and embedded app and extension software running on the devices of the users. The architecture is generally flexible and scalable to allow many users in many virtual interactive environments (akin to virtual rooms) to be involved at one time. Sometimes the users can see and experience each others' inputs and experiences if they are in a same virtual interactive environment (or virtual room), but in other cases, users can wander off into separate virtual interactive environments by their own actions or by an action of a controller or administrator of the system.

Common thematic experiences such as gatherings relating to an event of common interest to the users can enhance the relevance and enjoyment of the experience. In other respects, social media connections or contacts or other demographic or profile similarities can drive the formation of a group of users sharing a common virtual interactive experience in one or more virtual interactive environments. The experiences can revolve around a theme of an event, performance, occasion, televised program, sporting venue, political or cultural topic, an interactive game, or numerous other themes. Among other objects, the present method and system permits large numbers of users to coexist in a global virtual interactive environment while making helpful decisions to divide the large number of users into manageable subsets or smaller groups in distinct virtual interactive environments or virtual rooms.

In other aspects, there can be a centralized controller (machine, human, or combined) that manages the operation of the system. Rules can be implemented to protect the users' identities or other legal or moral rights implicated by operation of the system. For example, young users can be monitored as to their interactions with non-minors in the system, including by creating virtual interactive environments specifically designated for persons over (or under) certain age limits. Persons not abiding by specified terms may be rejected from a virtual interactive environment, for example for posting or presenting obscene language or content in the environment. Others may be directed or invited to virtual interactive environments based on the subject matter of their discussions or other criteria.

In an aspect, some interactive virtual environments can be made private, while others can be made public. The private rooms are not accessible to the general public, or even in some embodiments, to a registered subscriber of a service. The public environments may be open to the general public or to any member of a subscriber service, depending on the desired configuration. In an embodiment, a "party of friends" can be established where a user is invited to a virtual interactive environment because he or she has at least one friend in the environment. In other embodiments, the user may be invited to an environment because of a determination that he or she has interests in common with the other participants in the environment. The designation of environments as public or private and the selection of the options and user permissions for the same can be implemented as a filter that monitors attributes or data or characteristics of the environments, their contexts, themes and users to made this determination.

Architecturally, the present system can include several components, which will be described according to preferred exemplary embodiments, below. In some cases, a central controller manages communication signals among a plurality of locations in a connected system, for example among four or more entities in such a system, including clients and servers. Each client may be afforded two data pathways, one carrying control messages to the system's back-end servers, and the other for media services such as audio or video content.

Figure 2:
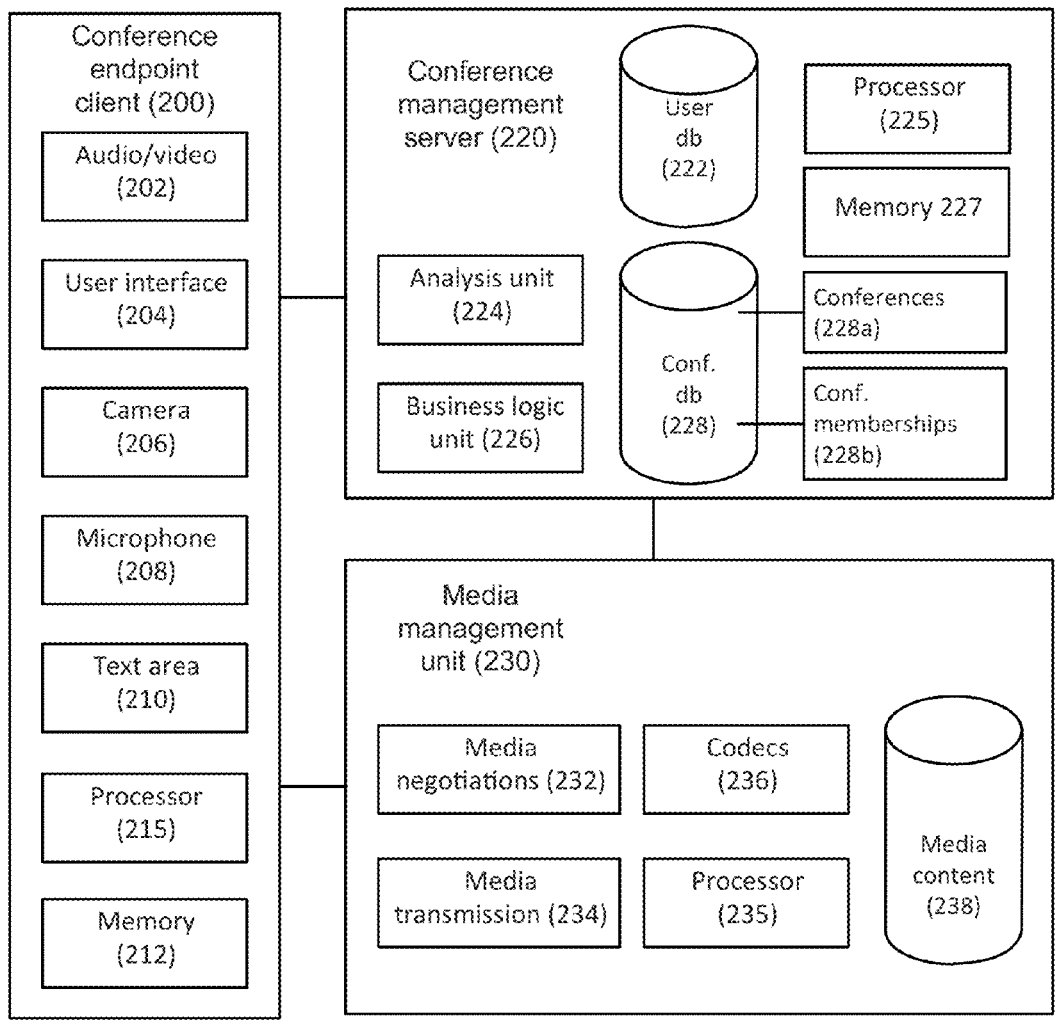
FIG. 2 illustrates some components of an exemplary architecture for carrying out the present inventions.

FIG. 2 illustrates an exemplary architecture of the present system 20 and on which the present method may be implemented. The system 20 is typically experienced by a user of a user device such as a personal computing device, tablet, smartphone or the like, which can be considered an endpoint or a conference endpoint client 200 in an arrangement of several or many such endpoints 200 in an experience sharing conference taking place. The endpoint device 200 can be a personal mobile computing communication device such as those running the iOS™ operating system from Apple, Inc. or running the Android™ operating system of Google, Inc. or the Windows™ operating system from Microsoft, Inc., or others.

The endpoint device 200 typically includes a number of input/output (I/O) and interface elements allowing easy use by a user. These include in some examples an audio output 202, a user interface 204 (which can include hardware and/or software elements), a camera 206, a microphone 208, a text input area 210, and others. In addition, the client device 200 endpoint typically includes a processor 215 capable of controlling the operation of the device by executing instructions of an operating system thereon. Some or all the instructions and data needed to operate the endpoint device 200 may be stored in a memory 212, which can include RAM, ROM, Flash or other volatile and/or nonvolatile digital storage space.

As mentioned before, the endpoint client device 200 can hold and run media viewing software, browsing software, network connectivity software and other plug-ins and extensions of these to collaboratively achieve the present goals and functions.

The endpoint device 200 can communicate with a conference management server 220 and a media management unit 230. The management server 220 and media unit 230 are shown as separate entities in this example, but it is only given for the purpose of illustration. Those skilled in the art will understand that each of these components can be implemented on co-located or distributed pieces of equipment without loss of generality. A general purpose server machine or a specialized arrangement of hardware running appropriate software, typically using an operating system to manage the same, can be utilized.

In an aspect, a plug-in piece of software is installed on a client computer or other processing device (including a smart phone, tablet or similar device). The client plug-in allows a user of the client to take part in the above service. The plug-in and other software on the client computer are used to present media content and to facilitate interactive communication between a plurality of friends or users enjoying a shared virtual experience.

Conference management server 220 can also include memory 217 holding instructions and other data for use by processor 225. The conference management server 220 includes an analysis unit 224 for analyzing users and other information and data and may include a business logic unit 226 for special operations. A user database 222 includes storage space or addressable memory for user data related to the plurality of users registered to use the service or system. A conference database 228 holds data relating to one or more conferences or interactive virtual conference sessions, including conference identifying information 228a and conference membership data 228b.

Media management unit 230 may share or have its own processor 235 and/or media content database 238. It also includes a unit for media negotiations 232, which can communicate for example with the conference endpoint 200. The media management unit 230 can also include a media transmission unit 234 for managing transmission or media from media content database 238.

A gatekeeper or other load balancing logic can ensure scalability to support a relatively large number of users or participants. For example, an interactive virtual environment can be limited to a maximum number of participants at any given time. Similarly, a subset of environments can be limited to a maximum number of simultaneous participants. If the maximum number has been reached, the system may not show the environment or subset as available, may show an indication that it is full, or there may be a waiting queue to join, similar to how a restaurant or physical venue may be sold out or have a waiting list.

The various components described can be subdivided in other ways than discussed in this example. Also, components shown in these examples as separate may sometimes be implemented as combined in other examples. The major parts of such a system can include client and server components in communication over a network such as the Internet or another local area or wide area network. Media content can be provided by one or more sources distributed over the network.

Figure 3:
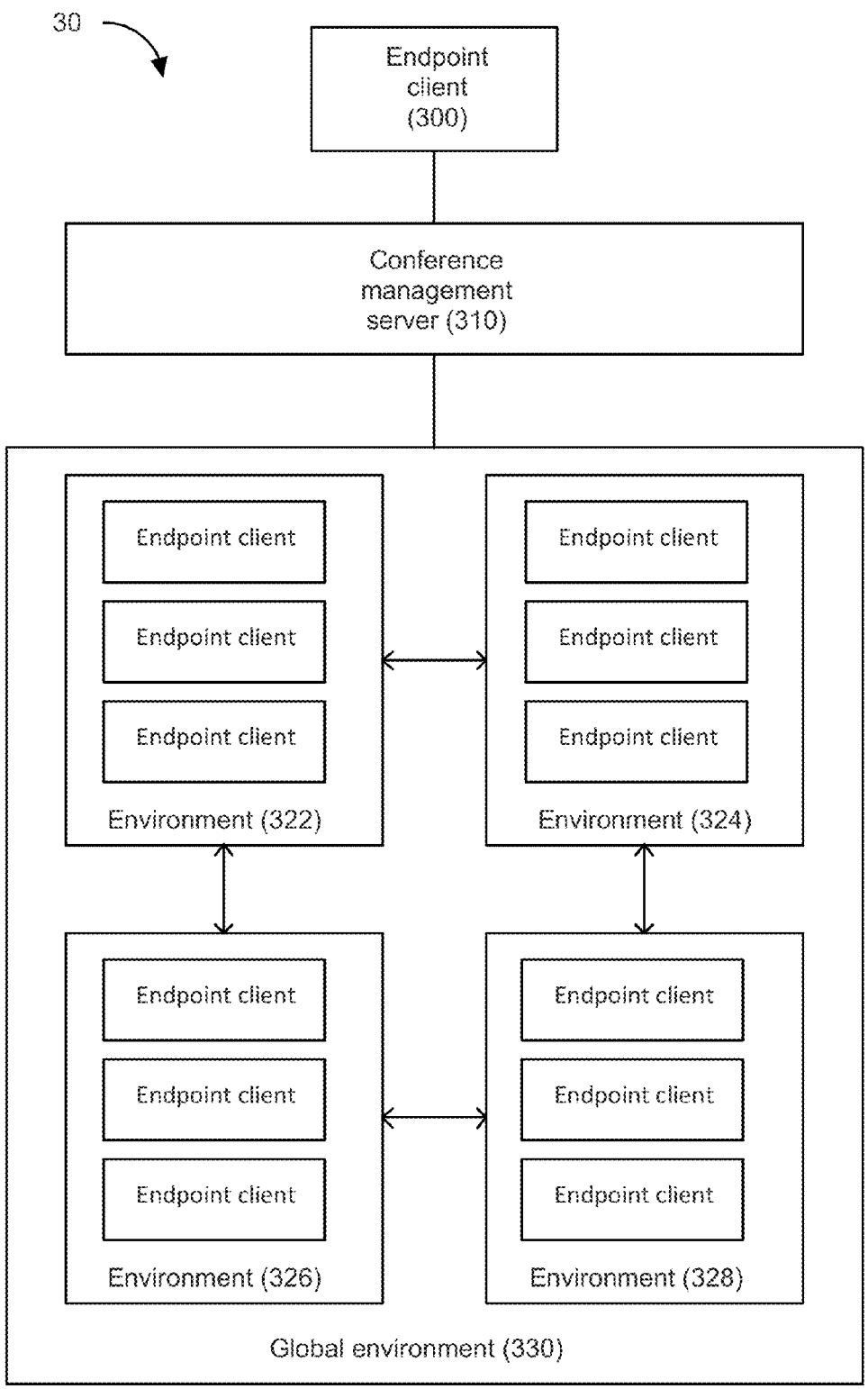
FIG. 3 illustrates a plurality of interactive virtual environments and subsets thereof.

FIG. 3 illustrates an exemplary abstraction of interactive virtual environments from the perspective of a participant in such a shared experience or conference (taken generally in the present context with the attendant enhancements described and known in view of this disclosure). A system comprising a global environment 30 coordinated by a conference management server 310 or similar management software and/or hardware as discussed herein is used to operate the environments and coordinate the entry of users to the environments.

An endpoint client device 300 connects to the management server 310 over some communication link such as the Internet or other cabled or wireless or cellular communication network or link. In addition, other groups of endpoint clients are clustered into meaningful subsets of users 322, 324, 326 and 328 within respective interactive virtual environments. Users can navigate among or be transported in the environments according to the wishes of the users and their interests, or according to rules programmed into the system as mentioned herein. In some aspects, the system offers a global environment 330 that can support multiple hierarchies of categorization and sub-division under the umbrella of the global environment 330. Interactive virtual environments or virtual rooms can be created, manually or automatically, containing themes and discussions and participant users at a high level, intermediate level, low level and so on. In an aspect, a user can view a summary representation of similar subsets of environments to those he or she is in or is interested in. The user can then select or "favorite" a cluster or an environment in a cluster based on its summary and use this to navigate between virtual environments available.

A profile of users and environments can be created, and such profile data can contain characteristics defining the users and environments and these data can be stored as described above in databases so that one or more analytic, learning or clustering engines or algorithms can be applied to the data.

The system can support virtual portals or inter-connections among a plurality of individual interactive virtual environments whereby participants may be given access to, invited to, create, delete, or move among the environments during a given session. In some aspects, the movement between one interactive virtual environment and another takes place in a single uninterrupted online session.

In an aspect, the system includes a browser extension that is installed on a client device 200. The browser extension permits the overlay of relevant information on top of the browser content. For example, by overlaying graphical, text, data, video or other information onto the browser content. In some embodiments, the system synchronizes the contents of a client browser overlay to the contents in the browser based on the address, URL or other identifier of network-available content in the browser. This concept can be extended in some embodiments not only to typical Web-based content and browsers, but to media content generally available from a source on a network, including cable television (TV) or other connected data storage locations. On mobile devices and other personal multimedia-enabled endpoint clients the users can determine the content and content type on which the enhanced content can be overlaid.

In some embodiments, overlay information in the form of text boxes or "bubbles" can be placed onto a display screen of the client devices engaged in a virtual interactive session. The text bubbles can be manipulated using a client user interface so that they can be moved to a desired location on the client's screen, deleted, resized and so on. These can be in the form of dynamic video stream bubbles as well, containing any suitable media streaming content. In an embodiment, a picture of a user or participant can be animated into a video stream when an event such as touching a picture of that user or participant on a device display.

The overlaid enhanced content presented on top of the basic shared media content to an endpoint client device user can have attributes of a transparent layer containing the enhanced content. The enhanced content can be presented on a computer display screen, monitor device connected to the endpoint client, the screen of a mobile apparatus, a television screen, projection screen or other such visual display unit. We may refer to this enhanced content generated by the users of the environment as a "social layer" given its nature and use. The enhanced content allows the users to interact with one another, or to see pictures and video of one another, or to share written comments or audio with one another while sharing the basic media content underneath, whether it be a Web site, television channel or other shared content.

In an embodiment, interacting users can watch a same screen (e.g., a television or computer monitor screen) showing some media content (e.g., a televised program or Web site) and they can exchange enhanced content on another (second) screen such as the screen of a mobile device (e.g., smartphone, tablet, etc.) Therefore, the users in an interactive virtual environment are each enjoying more than one screen to complete the experience: a first screen showing a common piece of media content, and a second screen showing enhanced content that the users and interactively creating and sharing with one another. An example may be that the users are watching a movie, concert broadcast, the news or a sports event on a computer or television screen, and the users are sharing enhanced content such as comments, video, pictures and audio that they generate and share with one another relating to the program they are watching.

In some aspects, the first screen is showing a broadcast piece of content generated by a broadcasting service, site or channel, while the second screen is displaying a "social layer" generated by the users themselves. The social layer can be presented as chat windows or cartoon-like "bubble" dialogues on the screen of the respective users' devices. Special content may be inserted into the social layer representing for example a logo of a sports team involved in the broadcast being viewed by the group. Other special content can include advertising content shown in one or more portions of the social layer.

In an embodiment, a user can manipulate the social layer dialogues, for example the bubbles, and join more than one such bubble or dialogue portion together, placing them where he or she likes on his or her endpoint screen. This can facilitate dynamic public, private or semi-private conversations among selected participants.

As before, a host or moderator may have some degree of control over the interactions taking place in an interactive virtual environment. This prevents abuse and can add value to the other users of the environment. The host can capture a session in an interactive virtual environment and record it for subsequent transmission.

Other user interface features that can be incorporated into embodiments of the present system and method include allowing the user to control the appearance or behavior of the system by touching, swiping or making other gestures to an input device (e.g., a touch-sensitive device screen), or by shaking the device to affect a built-in accelerometer.

In other aspects, users of mobile tablets, smartphones and similar devices can jot hand-written annotations on the screens of their devices during a live video chat session with friends and others in a shared interactive virtual environment. This information can be in the form of an overlay to the underlying video chat content and other URL or network-derived context.

In yet another aspect, a host or master user can be defined for a given interactive session involving a plurality of participants. Herein, if and when the master user changes the base address or URL for the session, the experiences of the other users change accordingly. So the master user can travel between one televised channel and another or between one Web site and another, making the context of the user experiences of the group change accordingly. Therefore, the group will "surf" around together, moving from one activity or context to another with the group's master user. In still another aspect, the control or identity of who is the master user can be passed from one member of the group to another member who then takes on the responsibility for controlling the context of the session. One example of the URL or context of a shared session could be a streaming movie or TV show or YouTube® or similar multimedia connection.

It can be seen therefore that a plurality of users in a session in a shared interactive virtual environment can co-browse together while engaging in video chat together and while exchanging other text or message signals among all or a subset of the users in the environment. In some aspects, a connection interface is used to manage the connectivity of users within the overall system described. In other aspects, clustering methods, implemented as executable or interpreted machine-readable instructions running in a processor may be used to achieve the above results and to configure the subsets of users sharing an interactive virtual environment.

A user can elect to leave from a shared interactive virtual environment if he or she wishes. For example, if the subject matter of the interaction is objectionable or uninteresting to the user he or she may head off to another available environment, or leave the application altogether. Users who are directed between environments or who navigate among them are tracked by previous and next pointers indicative of their movements and history in the system. These pointers can be used by the users or the system to direct the navigation or movement of the users therein.

Figure 4:
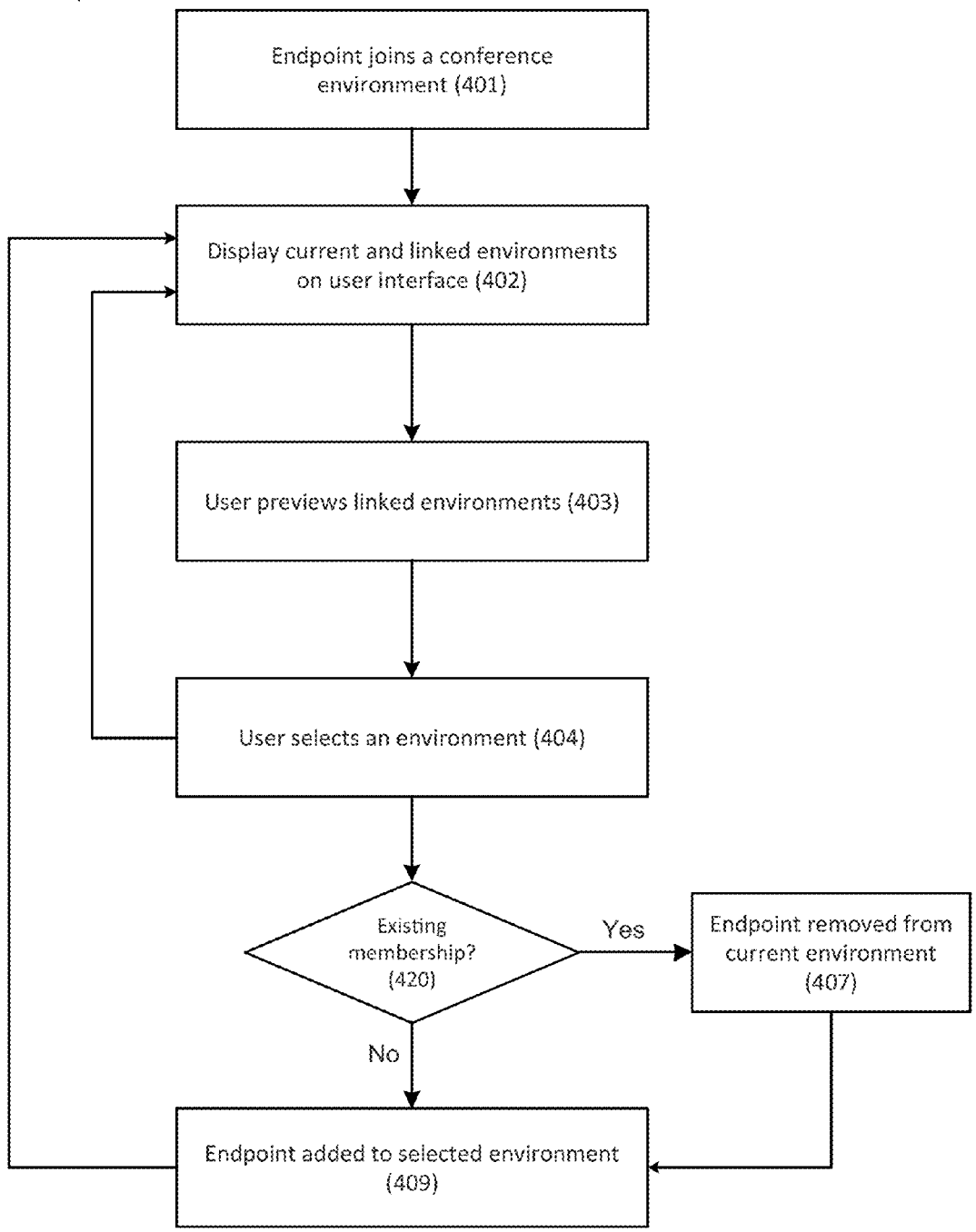
FIG. 4 illustrates steps in an exemplary method according to the present invention.

FIG. 4 illustrates an exemplary process or method 40 executed according to the present invention. The method may be computer-implemented and exploit programmed instructions residing in digital memory storage units on a computing machine that has one or more processor circuits to run the instructions. A user at an endpoint device joins a conference or navigates to an interactive virtual environment at step 401. The interactive virtual environment is a subset of global interactive virtual environments instantiated on the system. This may be done by the user manually using a user interface of the device. If the user is not a member of an environment, the conference management component may do so for him or her, as could another entity responsible for assignment of users to environments. Typically, the user can enjoy and participate in the current interactive environment using his or her device's visual interface, e.g., a display screen, along with any audio components needed at step 402. Various information and identification of the current environment and linked environments may be presented to the user at his or her endpoint device's display.

Specifically, one or more linked interactive virtual environments logically connected to the current environment may be previewed at step 403. Then, at step 404 the user may select a linked environment. The system checks if the user has a membership in the selected environment at step 420. If he or she does, the endpoint device is removed by the conference management component from the current environment at step 407 and the endpoint device is added to the newly selected environment at step 409. Otherwise, if it is not a member already, the endpoint device is added to the newly selected environment.

Figure 5:
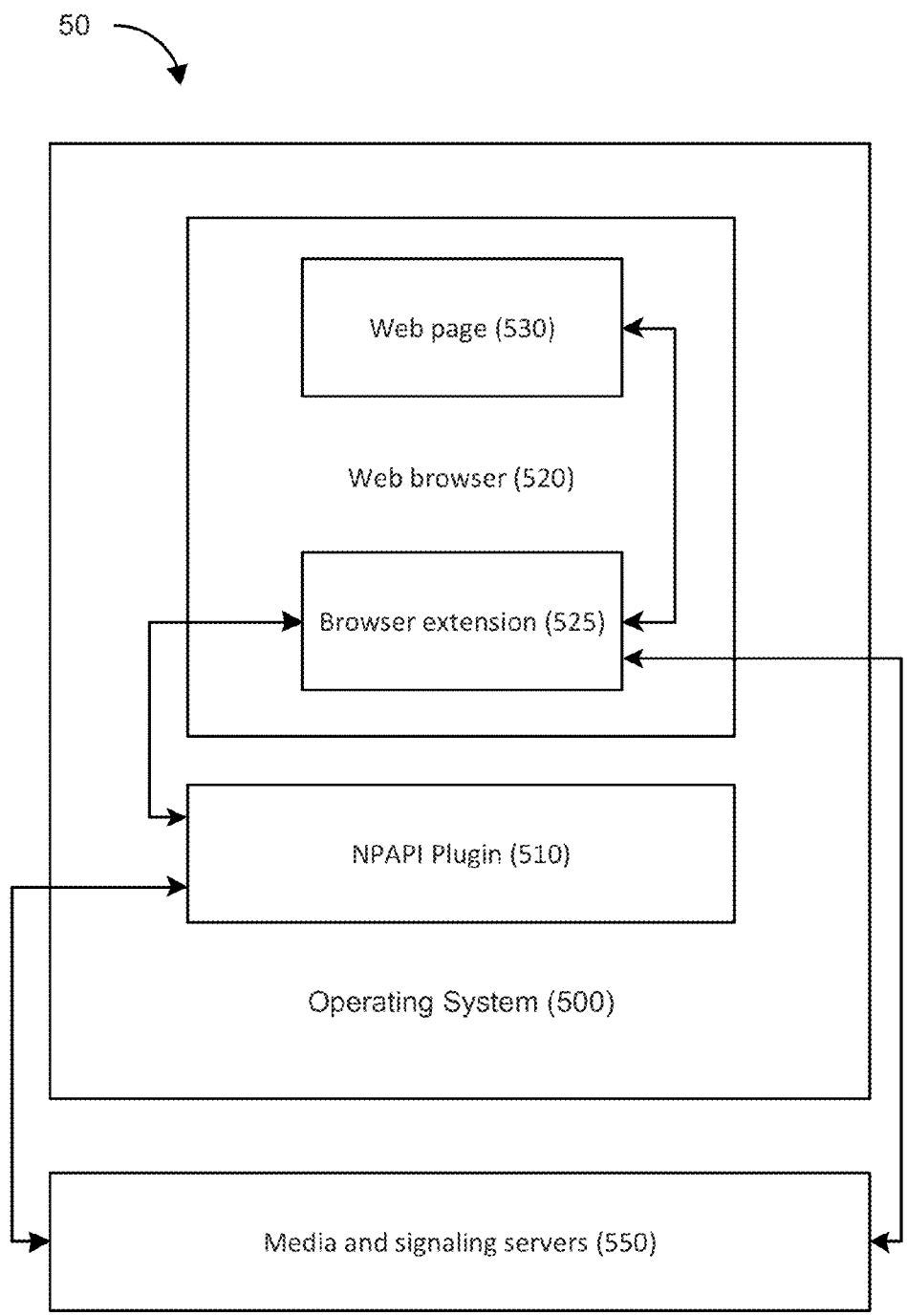
FIG. 5 schematically illustrates a client endpoint configuration.

FIG. 5 illustrates an exemplary endpoint client device configuration 50, which can run for example on a client computer, tablet or smartphone or other processing apparatus. The device runs an operating system 500 that handles the major housekeeping and coordination processes on the device. An application program interface (API), for example the Netscape plugin API (NPAPI) 510 is also running on the device and interacts with Web browser 520. The NPAPI 510 can perform the following services: it can send and receive multimedia streams between the device and the servers; send and receive signaling messages; process video streams including to buffer, crop, mask, filter, etc.; and it can play a role in rendering the processed video frames.

A browser extension 525 of browser 520 is installed and can affect the contents presented by the device including those of Web page 530 as it is presented. The browser extension 525 allows the system to affect or control the Web page contents as presented to the user of the endpoint client device. It can also be used to inject scripts and/or styles into a Web page to add functionality not otherwise available in the basic Web page. In addition, the browser extension 525 permits user interface and user experience customizations and interactions, for example in controlling the type, shape, size, location and other attributes of a text box or bubble presented on an underlying screen display.

The browser extension 525 and the API plugin 510 exchange data by method invocation and event dispatching. In some aspects the API plugin may have full system privileges on the device while the browser extension 525 has limited privileges. In a specific example, the browser extension 525 is limited to only opening http-based connections (e.g., http requests and Web sockets).

The Web extension 525 can be selected by a user by clicking on it in his or her browser according to an aspect. The extension 525 will then send the media and signaling servers 550 the current URL (or channel, program code, etc.) of the page the user is browsing. The server 550 will return to the Web extension 525 a conference identification number (ID). The Web extension can use this ID to then start the API plugin 510 which in turn connects to the media servers 550 and joins the resolved conference.

In an aspect, when the plugin 510 is connected, the local stream of the user will pop up as a bubble on top of the Web page the user is viewing (or the TV channel), and this also will take place on the screens of each other participant in the environment.

Media and signaling servers 550 are coupled to each of the NPAPI plugin 510 and the browser extension 525 over respective communication links. Each user of the endpoint client devices connects to the media and signaling servers 550.

We can refer to content available to users generally as broadcast content or programming insofar as it is provided to the public or to a group of subscribers by an entity that publishes the content. Examples are Web sites published by the owner of the sites, or televised programs, or videos uploaded to Vimeo®, YouTube® and similar sites.

The following is an example of how users of endpoint client devices may employ the social layer in conjunction with watching a broadcast program to add to the enjoyment of the viewing experience. First, a user tunes to (with a television channel selector or a Web browser or other tool) a broadcast program. An example may be watching a televised sports event. Then, he or she opens an application on his or her personal endpoint device such as a smartphone running the present client-side applications and interfaces. The user's application can detect or be keyed to what broadcast content is being viewed to identify the program. This can be done automatically by way of audio and/or video detection software. Once the broadcast content is identified by the application, the system connects the user to other users or friends who are also watching the same broadcast program. Alternatively, the system can invite such friends to watch the program. Next, when each of the participants are tuned to the broadcast (which can, again, be from a cable network, satellite signal, Web content or other published content) and when each user has his or her application for social layer interaction activated, the users can enjoy both the broadcast content as well as the enhanced social layer content together.

Figure 6:
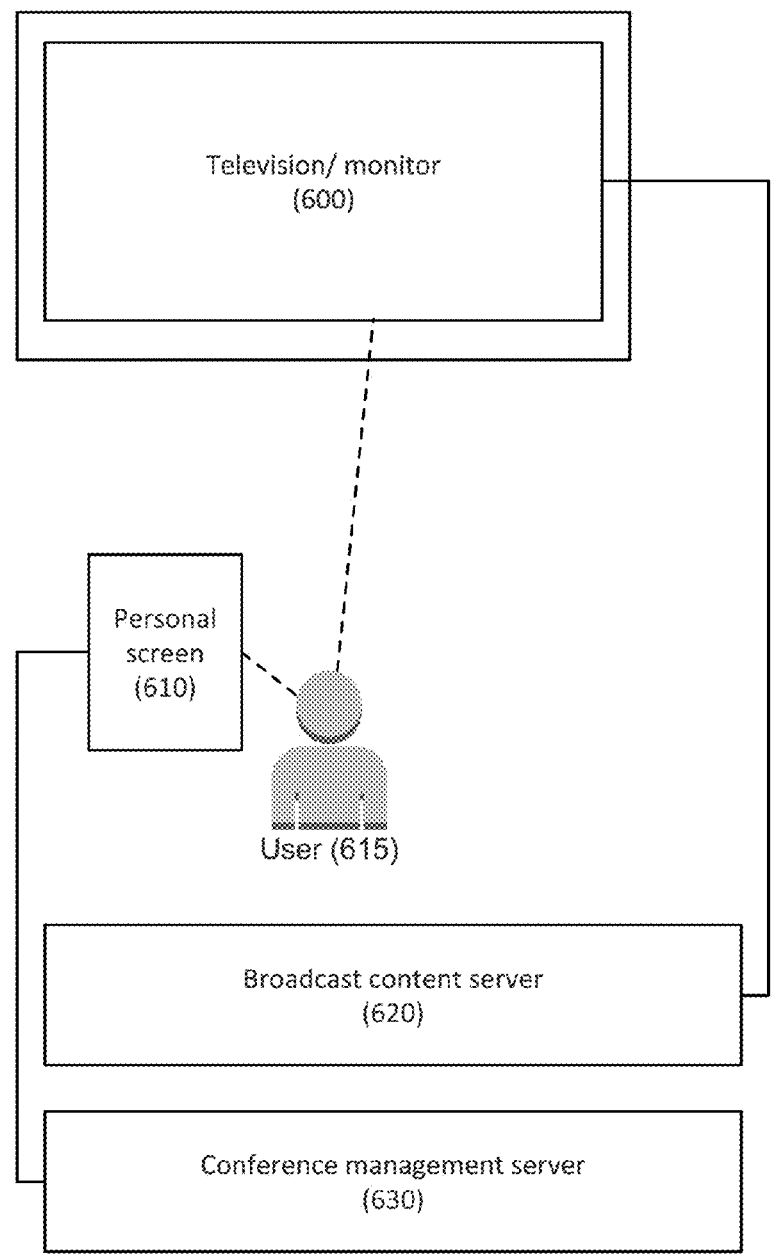
FIG. 6 illustrates a two screen user experience architecture.

FIG. 6 illustrates a simplified schematic of a two screen shared user experience arrangement 60. A user 615 is invited to or browses to watch broadcast content on a television screen or monitor (a first screen) 600. The broadcast content comes from a broadcast content server 620, which can be a cable network, satellite broadcast or other Internet or Web based site or stream of media. The user 615 has access to a personal endpoint client device having a second screen 610. The user can interact with friends watching the broadcast content in real-time using a conference management server (630) as described above.

A key combines an identification of the user 615 or his endpoint device, and also an identification of an address or source of the broadcast content. These combined in a single key allow this user 615 and others similarly situated to share in a virtual interactive environment including the two screens each is watching and using. In another embodiment, the social layer or user interactive content is an enhanced layer of information presented over the broadcast content on a same (one) screen, e.g., the television screen 600.

In an embodiment, a group of friends can co-browse or co-shop together, with one of the participating friends acting as a host or leader or master of the shared experience. The leader can jump from page to page of broadcast content (e.g., Web sites or TV channels) and the other participants' browser applications will follow the leader because of the actions of their respective browser application extensions. Any user can opt to leave the group.

Of course the above examples are provided as examples of the operation and construction of the system and method of the invention. Many of the exemplary features of these embodiments can be revised or alternates chosen to achieve a same or equivalent end. Therefore, the invention is not limited by the above examples, and those skilled in the art are expected to find custom implementations and extensions of this disclosure suiting their applications and ends along these lines, all of which are comprehended by the following claims.

The invention claimed is:

1. A system for sharing interactive virtual environments, comprising:
    a conference management server adapted and programmed to couple to a plurality of conferenced client endpoint devices over a communication network;
    a user database of registered users accessible by the conference management server, the user database containing information about each of a plurality of registered users of the system;
    a broadcast content server delivering broadcast media content created by a publisher of the broadcast media content;
    an application program interface installed on each of the plurality of conferenced client endpoint devices permitting connection of said client endpoint devices to said conference management server and permitting exchange of enhanced social layer content among the client endpoint devices corresponding to and relating to the broadcast media content; at least one client endpoint device configured to:
    detect an identifier of the broadcast media content being presented on a display device in proximity with the at least one client endpoint device; the display device distinct from the conference client endpoint devices and connected to the broadcast content server;
    generate a key based on the identifier of the broadcast media content and an identifier of the at least one client endpoint device; and
    transmit the key to the conference management server to permit the exchange of the enhanced social layer content.

2. The system of claim 1, said broadcast content server comprising a Web server.

3. The system of claim 1, said broadcast content server comprising a cable network content server.

4. The system claim 1, said broadcast content server comprising a satellite broadcaster.

5. The system of claim 1, said social layer including live video streams depicting users of said database and said live video streams being provided by a video camera of said client endpoint devices.

\* \* \* \* \*